March 29, 1966 H. WAGENER 3,242,581
VERTEX REFRACTIONOMETER WITH MARKING DEVICE
Filed Feb. 1, 1965 2 Sheets-Sheet 1

INVENTOR:
Heinrich Wagener,
BY Singer, Stern &
Carlberg, Attorneys

March 29, 1966   H. WAGENER   3,242,581
VERTEX REFRACTIONOMETER WITH MARKING DEVICE
Filed Feb. 1, 1965   2 Sheets-Sheet 2

United States Patent Office 3,242,581
Patented Mar. 29, 1966

3,242,581
VERTEX REFRACTIONOMETER WITH MARKING DEVICE
Heinrich Wagener, Gottingen, Germany, assignor to Carl Zeiss-Stiftung, Brenz, Wurttemberg, Germany, a corporation of Germany
Filed Feb. 1, 1965, Ser. No. 429,578
Claims priority, application Germany, Feb. 8, 1964, Z 9,007
3 Claims. (Cl. 33—174)

The invention relates to a vertex refractionometer provided with a device for marking the centering point and the horizontal axis of the eye glass tested.

It is known to make these markings by means of small stamps arranged above the support for the glass tested. However, it has been found annoying that the felt of the stamps dries out relatively quickly.

It is the object of the invention to overcome the aforementioned disadvantage by providing three capillary tubes which are arranged above the support for the eye glass to be tested in their discs. These capillary tubes are associated each with a supply container for a liquid dye and in their rest position are urged resiliently with their lower ends against sealing discs.

The drawing illustrates by way of example one embodiment of the invention.

Figure 1:
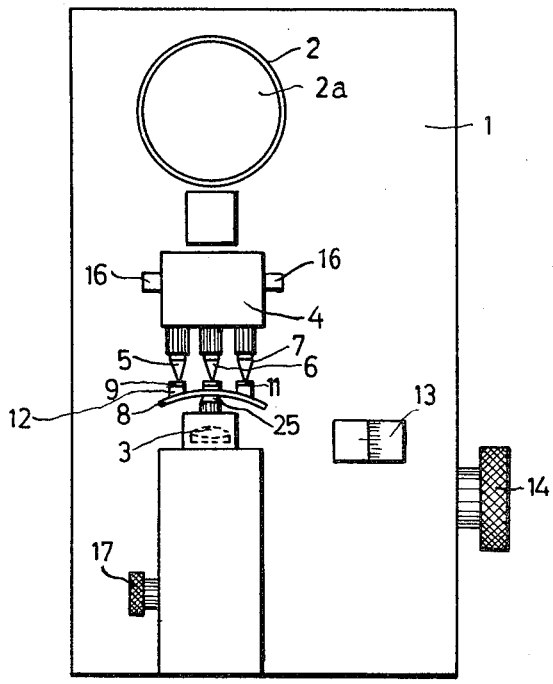
FIG. 1 illustrates diagrammatically a front elevation view of the projection vertex refractionometer.
Figure 2:
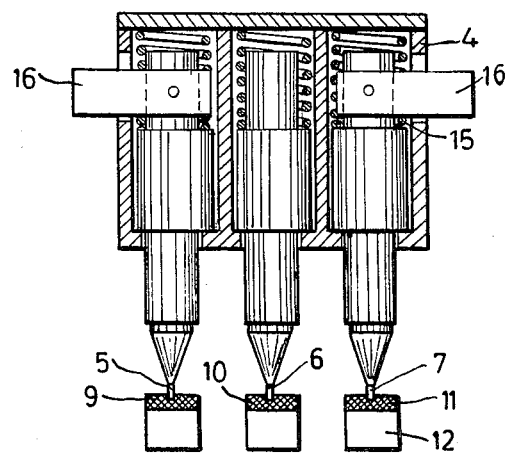
FIG. 2 is a front elevation view of the capillary tubes with their holder, partly in section.
Figure 3:
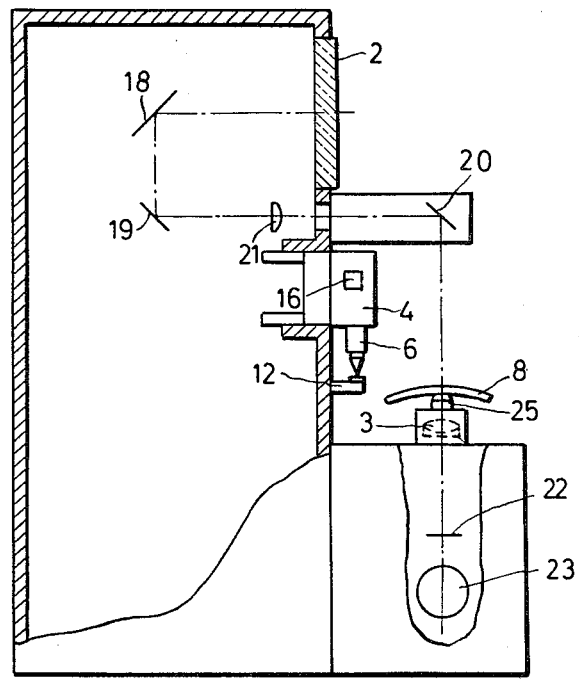
FIG. 3 illustrates diagrammatically a side elevation view of the projection vertex refractionometer.

Referring to the drawings, the front wall of the instrument casing 1 is provided with a circular window 2 having therein a transparent projection screen 2a onto which the image of a test mark 22 is reflected by means of an optical system comprising a collimator objective 3, three reflectors 20, 19, 18 and a projection lens 21. The test mark 22 is illuminated by a source of light 23.

In a holder 4 which is horizontally slidably attached to the casing 1 are resiliently arranged three vertically positioned capillary tubes 5, 6, 7 each provided with an ink supply container. The capillary tubes 5, 6, and 7 when not in use, are urged by springs 15 with their lower ends against sealing discs 9, 10 and 11, respectively, which are fixedly attached to shelf brackets 12 mounted on the front wall of the casing 1. The capillary tubes are arranged, as shown, parallel to one another in a single row, but they may also be arranged to form with their lower ends an obtuse-angled triangle the point of which is formed by the lower end of the center capillary tube 6. The two outer capillary tubes 5 and 7 may be raised by a handle 16 a sufficient distance above the level of the lower end of the center capillary tube 6 so that the same are moved away from their operative position, whereby only the center capillary tube 6 produces a marking point when the holder 4 with the capillary tubes 5, 6 and 7 thereon is pulled horizontally outwardly over the eye glass 8 on the support 25 and then is pressed downwardly in engagement with the eye glass 8. When all three lower ends of the capillary tubes 5, 6, 7 are arranged at substantially the same level and are moved to a position above the eye glass 8, which latter is arranged above the collimator objective 3, a downward movement of the capillary tubes causes all three of them to engage the top surface of the eye glass 8 on the support 25. The marking point made by the capillary tube 6 indicates the center point of the eye glass, while the line between the two outer points made by the capillary tubes 5 and 7, respectively, indicates the horizontal axis of the eye glass.

After each use the capillary tubes 5, 6 and 7 are closed by the sealing discs 9, 10 and 11, respectively, which in the illustrated manner form supports for the capillary tube 5, 6 and 7 in their inoperative position.

A manually rotatable knurled knob 14 projecting from a side wall of the casing 1 is used for focussing an image of the test mark 22 on the screen 2a by adjusting the mark 22 in vertical direction. Another manually rotatable knurled knob 17 is used for rotatably adjusting the test mark 22 about the optical axis of the collimator objective 3. The diopter values appear in the window 13.

What I claim is:

1. A vertex refractionometer for eyeglass lenses, comprising a casing having a front wall, a transparent projection screen mounted therein, reflecting means including a projection lens for reflecting an image on said screen, a light source and a condenser lens mounted in front of said casing, a holder above said lens for supporting the eyeglass to be tested, means for marking the center point and the horizontal axis of the eyeglass to be tested, said means comprising a support slidably mounted for horizontal movement in said casing between positions of rest and operation above the eyeglass to be tested, three resiliently arranged and vertically positioned capillary tubes movably mounted in said support and having a container filled with a liquid coloring matter, the two outer of said capillary tubes being provided with a handle for moving the same vertically when the support is moved between its rest and operative positions, bracket members mounted on the front wall of said casing, and sealing discs mounted on said elements adapted to close said capillary tubes when the support is in its at rest position and displaced from its operative position.

2. A vertex refractionometer for eyeglass lenses, comprising a casing having a front wall, a transparent projection screen mounted in said front wall, reflecting means for reflecting an image on said screen, a projection lens in said reflected light path, a light source mounted in front of said casing for directing light rays upwardly toward said reflecting means, a condenser lens mounted above said light source, an eyeglass holder mounted above said condenser lens to support the eyeglass lens to be tested, means for marking the center point and the horizontal axis of the eyeglass lens to be tested, said means comprising a support slidably mounted for horizontal movement in said casing between operative and at rest positions, three capillary tubes movably mounted in said support for vertical reciprocation between operative and offset positions, each of said capillary tubes being provided with a chamber adapted to contain liquid coloring matter, manual means for moving said capillary tubes upwardly, yielding spring means for urging said capillary tubes downwardly, bracket means on said casing wall, sealing elements supported by said bracket means directly beneath each of said capillary tubes when the support is in its at rest position and offset from its operative position when marking the center point of the horizontal axis of the eyeglass lens, whereby said capillary tubes can be lifted from said sealing means and moved to an operative position above said eyeglass lens being tested for marking and after marking can be returned to their offset position above said sealing means and held in engagement therewith by said yielding spring means.

3. A vertex refractionometer for eyeglass lenses, comprising a casing having a front wall, a light source in front of said casing including a condenser lens for directing a beam of light vertically, reflecting means above said light source, a transparent projection screen mounted in said front wall for receiving reflected rays from said light source, a lens holder above said condenser lens for supporting the eyeglass lens to be tested, a support slidably mounted in said front wall above said lens holder for horizontal movement between rest and operative positions above the eyeglass lens to be tested, three vertically movable capillary tubes mounted in said support, a container for supplying liquid coloring matter to said capillary tubes, bracket members on said casing wall, a sealing disc on each of said bracket members, yielding spring means for urging said capillary tubes downwardly into engagement with said sealing discs when said slidable support is in its rest and operative positions, and manual means for vertically moving at least two of said capillary tubes upwardly against the yielding action of said spring means when said support is moved from its rest position to its operative position, and from its operative position to its rest position.

References Cited by the Examiner
UNITED STATES PATENTS

| | | | |
|---|---|---|---|
| 2,172,539 | 9/1939 | Kimmich | 346—140 |
| 2,199,078 | 4/1940 | Lindemann | 346—140 |
| 2,582,275 | 1/1952 | Poetsch | 33—18 |
| 2,803,884 | 8/1957 | Polley | 33—174 |

ISAAC LISANN, *Primary Examiner.*

SAMUEL S. MATTHEWS, *Examiner.*